US011151736B1

(12) United States Patent
Schwartz et al.

(10) Patent No.: US 11,151,736 B1
(45) Date of Patent: Oct. 19, 2021

(54) APPARATUS AND METHOD TO OBTAIN UNPROCESSED INTRINSIC DATA CUBES FOR GENERATING INTRINSIC HYPER-SPECTRAL DATA CUBES

(71) Applicant: Center for Quantitative Cytometry, San Juan, PR (US)

(72) Inventors: Abraham Schwartz, San Juan, PR (US); Philip Sherman, Cleveland, OH (US); Emma Fernandez Repollet, San Juan, PR (US)

(73) Assignee: Center for Quantitative Cytometry, San Juan, PR (US)

( * ) Notice: Subject to any disclaimer, the term of this patent is extended or adjusted under 35 U.S.C. 154(b) by 0 days.

(21) Appl. No.: 17/208,087

(22) Filed: Mar. 22, 2021

Related U.S. Application Data

(63) Continuation-in-part of application No. 16/888,660, filed on May 30, 2020, now Pat. No. 10,969,523.

(51) Int. Cl.
*G06T 7/536* (2017.01)
*G01J 3/28* (2006.01)
(Continued)

(52) U.S. Cl.
CPC ............ *G06T 7/536* (2017.01); *G01J 3/0297* (2013.01); *G01J 3/04* (2013.01); *G01J 3/2823* (2013.01); *G02B 5/0263* (2013.01); *G06F 16/535* (2019.01); *G06T 5/50* (2013.01); *G06T 7/586* (2017.01); *G06T 2207/10036* (2013.01)

(58) Field of Classification Search
CPC ........... G06T 7/536; G06T 7/586; G06T 5/50; G06T 2207/10036; G06G 16/535; G01J 3/0297; G01J 3/04; G01J 3/2823; G02B 5/0263
See application file for complete search history.

(56) References Cited

U.S. PATENT DOCUMENTS 7,701,489 B1    4/2010  Christie et al.
2012/0327248 A1* 12/2012  Tack .................... G01J 3/2803
                                            348/164
(Continued)

OTHER PUBLICATIONS

Chen et al., "Intrinsic decomposition from a single spectral image", Jul. 2017, Applied Optics, vol. 56, No. 20, pp. 5676-5684 (Year: 2017).*

*Primary Examiner* — David P Porta
*Assistant Examiner* — Jeremy S Valentiner
(74) *Attorney, Agent, or Firm* — Hoglund & Pamias, PSC; Roberto J. Rios

(57) ABSTRACT

An apparatus and associated methodology are provided to obtain intrinsic hyper-spectral data cubes such that the intrinsic spectrum associated with each pixel of the field of view does not contain irrelevant spectral components. This is accomplished by obtaining a focused spatial image of the field of view and a diffuse image of the field of view with a slit arrangement including a translucent material that allows imaging of a focused spatial image with its associated spectrum and a diffuse image of the illumination with its associated spectrum at essentially the same time. Unprocessed intrinsic data cubes are generated from the obtained spectrum which are processed with the intrinsic methodology of the invention to generate an intrinsic hyper-spectral data cube of the field of view.

18 Claims, 11 Drawing Sheets

(51) Int. Cl.
*G01J 3/04* (2006.01)
*G06T 5/50* (2006.01)
*G06F 16/535* (2019.01)
*G06T 7/586* (2017.01)
*G02B 5/02* (2006.01)
*G01J 3/02* (2006.01)

(56) References Cited

U.S. PATENT DOCUMENTS

2017/0016768 A1* 1/2017 Golub .................. H04N 5/2258
2018/0106900 A1* 4/2018 Droz ..................... G01J 3/0208
2020/0193580 A1* 6/2020 McCall ................. H04N 5/332

* cited by examiner $$\phantom{}_{X_1}^{X_p}\left[X_{n+1_{\lambda_{IS}}}\right]_{Y_1}^{Y_m} = \phantom{}_{X_1}^{X_p}\left[X_{n+1_{\lambda_{S_f}}}\right]_{Y_1}^{Y_m} - \phantom{}_{X_1}^{X_p}\left[X_{n+1_{\lambda_{S_d}}}\right]_{Y_1}^{Y_m}$$

$$\phantom{}_{X_1}^{X_p}\left[X_{n+2_{\lambda_{IS}}}\right]_{Y_1}^{Y_m} = \phantom{}_{X_1}^{X_p}\left[X_{n+2_{\lambda_{S_f}}}\right]_{Y_1}^{Y_m} - \phantom{}_{X_1}^{X_p}\left[X_{n+2_{\lambda_{S_d}}}\right]_{Y_1}^{Y_m}$$

$$\phantom{}_{X_1}^{X_p}\left[X_{n+3_{\lambda_{IS}}}\right]_{Y_1}^{Y_m} = \phantom{}_{X_1}^{X_p}\left[X_{n+3_{\lambda_{S_f}}}\right]_{Y_1}^{Y_m} - \phantom{}_{X_1}^{X_p}\left[X_{n+3_{\lambda_{S_d}}}\right]_{Y_1}^{Y_m}$$

$$\phantom{}_{X_1}^{X_p}\left[X_{n+4_{\lambda_{IS}}}\right]_{Y_1}^{Y_m} = \phantom{}_{X_1}^{X_p}\left[X_{n+4_{\lambda_{S_f}}}\right]_{Y_1}^{Y_m} - \phantom{}_{X_1}^{X_p}\left[X_{n+4_{\lambda_{S_d}}}\right]_{Y_1}^{Y_m}$$

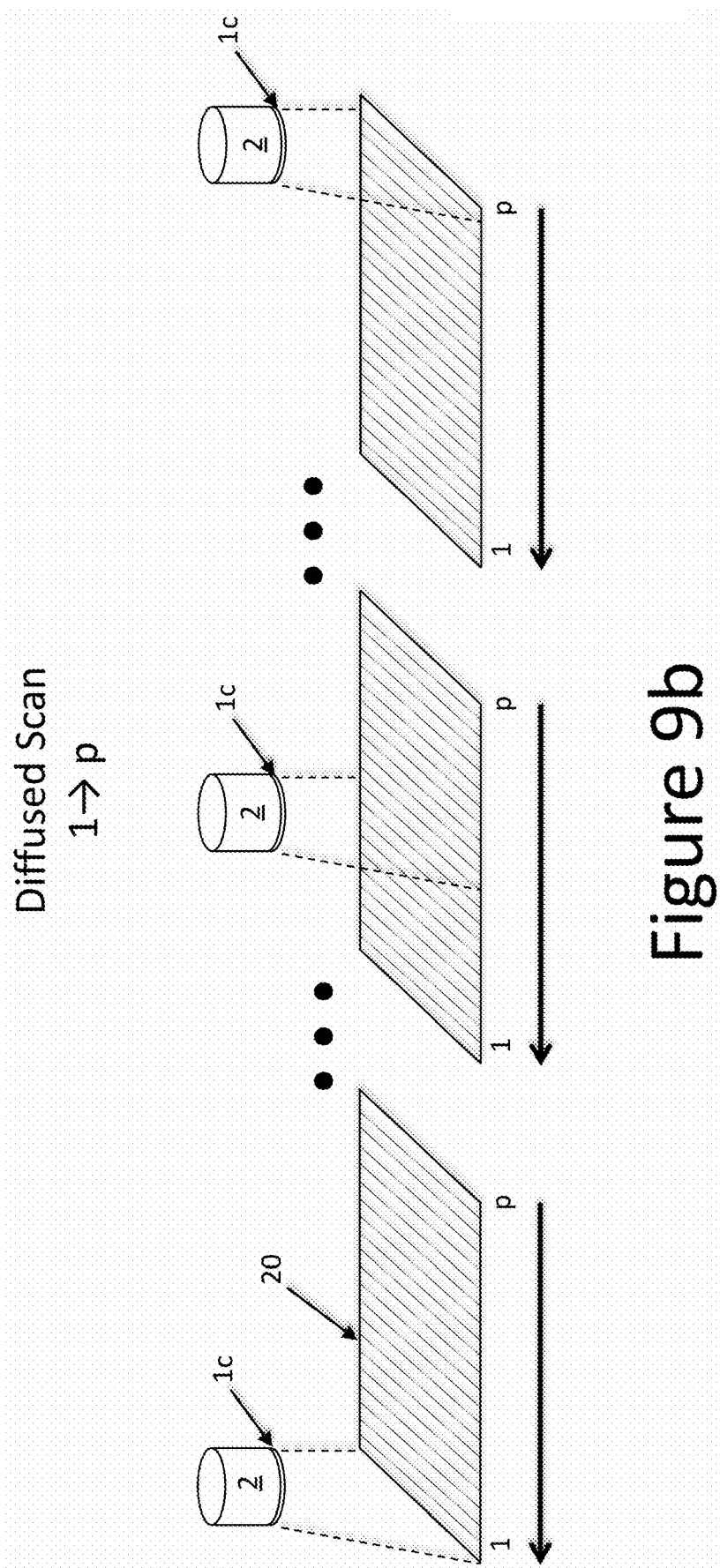

APPARATUS AND METHOD TO OBTAIN UNPROCESSED INTRINSIC DATA CUBES FOR GENERATING INTRINSIC HYPER-SPECTRAL DATA CUBES

TECHNICAL FIELD

The present apparatus and method generally relate to data derived from hyper-spectral cameras that obtain images and spectra from fields of view. Specifically, the invention relates to a slit arrangement for hyper-spectral cameras that include a translucent portion for obtaining spectral images used to generate intrinsic hyper-spectral data cubes. More specifically, the invention is related to a method of using the slit arrangement for generating intrinsic hyper-spectral data cubes of a field of view.

BACKGROUND OF THE INVENTION

Hyper-spectral imaging involves obtaining spatial and spectral information of a field of view from a digital array sensor. The data collected is arranged in three-dimensional data cubes consisting of a two-dimensional spatial image with the spectrum obtained from each pixel, respectively. Such an unprocessed data cube is illustrated in (a) on FIG. 1. By processing the data cube, images of specific spectral content can be displayed and analyzed to identify specific material(s) indicated by the spectral content.

There are several methods that may be used to obtain hyper-spectral data cubes with the most popular referred to as the push broom method. This method requires that either: 1) the hyper-spectral camera is moving across the field of view, as in the case of aerial surveys with drones, satellites or space stations, or 2) the hyper-spectral camera is fixed in position and the field of view is moving under the camera, as in the case of a conveyer belt or moving stage. In each case the field of view is imaged through a narrow slit that scans the X-axis moving across the field of view while obtaining spatial and spectral data. Unfortunately, the spectral content of each pixel in general is contaminated with irrelevant spectral components that may mask the intrinsic spectral components of the material of interest. The irrelevant spectral components arise from the foreground, background and the illumination. In many instances, the irrelevant spectral components are constantly varying over time which gives rise to inconsistences of the resulting spectrum. Due to these spectral inconsistences, it is common to have the spectra referred to as signatures, fingerprints or footprints, instead of spectra. Efforts to reduce these inconsistences employ mathematical modeling and obtaining post-reference data under conditions that are not the same as the intrinsic data. The irrelevant components and the methodology used to eliminate them are explained in U.S. Pat. No. 9,435,687B1 and U.S. Pat. No. 10,652,484B1, incorporated herein by reference in their entirety. As described in U.S. Pat. No. 10,652,484B1, by subtracting the image of the unfocused illumination from the same focused spatial image, the resulting image consists of only the intrinsic spectral components of the field of view.

SUMMARY OF THE INVENTION

The present invention provides an apparatus and methodology to obtain intrinsic hyper-spectral data cubes such that the intrinsic spectrum associated with each pixel of the field of view does not contain irrelevant spectral components to provide consistent spectra in order to identity the material imaged in the field of view. This is accomplished by obtaining a focused spatial image of the field of view and a diffuse image of the field of view that is an image of the illumination across the field of view. To eliminate the temporal spectral variation caused by environmental in the foreground and background, both images need to be obtained at the same time and under the same instrumental conditions. A novel slit arrangement is presented that allows imaging of a focused spatial image with its associated spectrum and a diffuse image of the illumination with its associated spectrum at essentially the same time.

According to an object of the invention, the slit arrangement has a slit opening twice the normal width with half of the slit open for focused data and half of the slit covered with a translucent material to provide diffuse data.

According to another aspect of the invention, the slit arrangement has two separate equal sized slits where one is open and the other is covered with a translucent material. The locations of the open and translucent slits on the field of view are then correlated and a software program matches the data from each diffused row of pixels corresponding to the focused row of pixels and calculates intrinsic spectra for that row spectra corresponding to the spatial images.

According to yet another aspect of the invention, the slit arrangement can be provided as part of an imaging device either as part of an imaging device during manufacture or as an after-market adapter.

According to one aspect of the invention, the method is implemented through a configuration where an imaging device is in a fixed position and the field of view is scanned via a precision movable stage or conveyor belt with the capacity to conduct a second scan covering the exact same field of view as the first scan.

According to another aspect of the invention, the first scan is conducted with the spatial field of view in camera focus and the second scan is conducted with a diffuse material covering the objective camera lens.

BRIEF DESCRIPTION OF THE DRAWINGS

Further features and advantages of the invention will become apparent from the following detailed description taken in conjunction with the accompanying figures showing illustrative embodiments of the invention, in which:

FIG. 6 illustrates the mathematical equations to calculate the intrinsic spectral data from the unprocessed intrinsic data cube. The intrinsic spectra are calculated by using the focused spectral data from the leading half of the novel slit in position, e.g., n, and subtracting the diffuse spectral data from the trailing half of the novel slit from the following position, e.g., (n+1), according to an embodiment of the invention.

FIG. 9b illustrates a configuration of an imaging device in a fixed position while a diffused scan of the field of view with a diffuse material covering the imaging device lens is carried out via a precision movable stage or conveyor belt, according to an embodiment of the invention.

Throughout the figures, the same reference numbers and characters, unless otherwise stated, are used to denote like elements, components, portions or features of the illustrated embodiments. The subject invention will be described in detail in conjunction with the accompanying figures, in view of the illustrative embodiments.

DETAILED DESCRIPTION OF THE INVENTION

The major components of a push broom hyper-spectral camera are the objective lens, the field of view slit, the spectrometer and digital camera.

Figure 2:
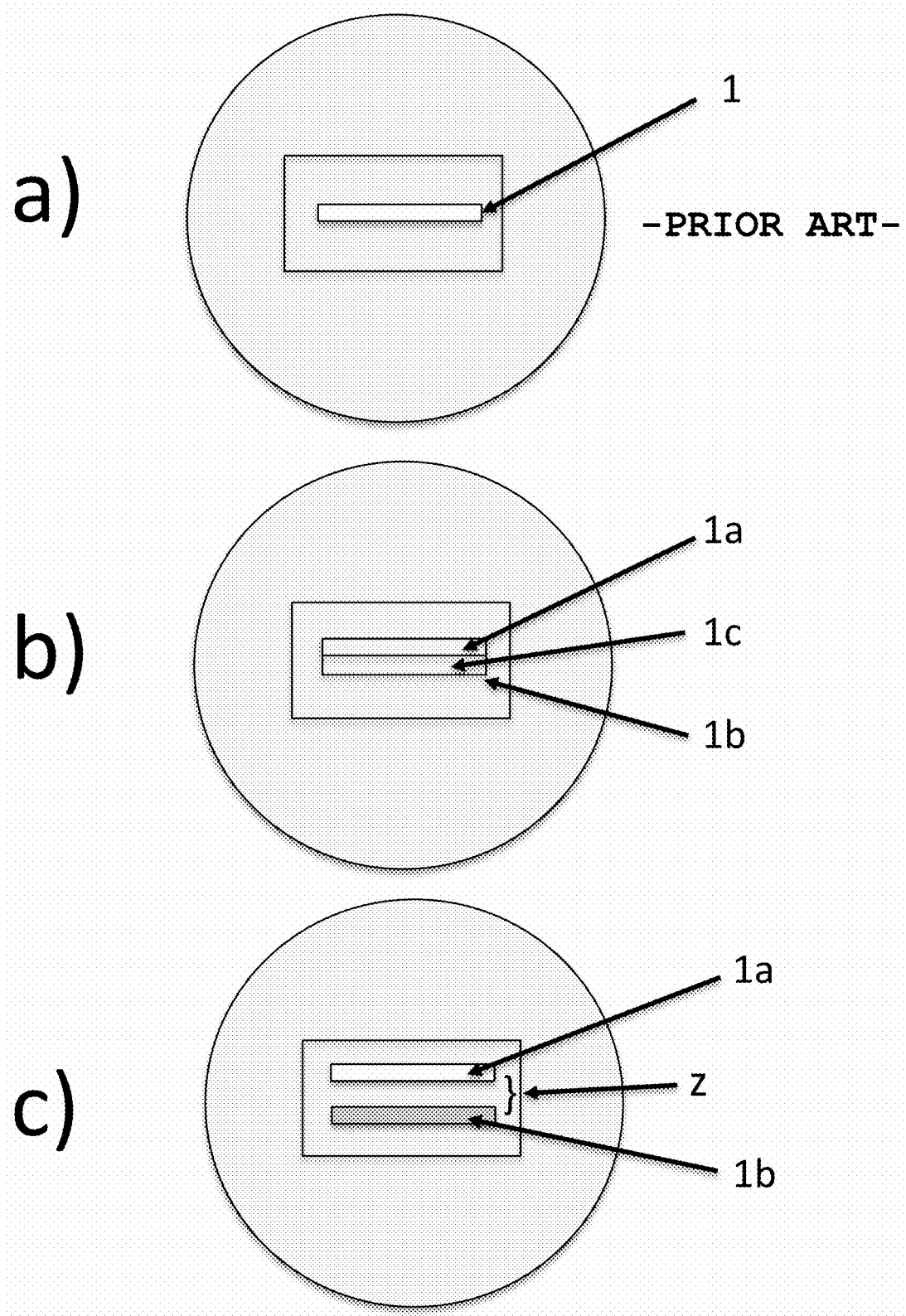
FIG. 2 illustrates in (a) the structure of a classic slit apparatus within a hyper-spectral camera with a simple opening, in (b) the structure of the novel slit apparatus with an opening twice the width where a translucent material covers half the width of the slit, and in (c) the slit apparatus having two separated equal sized slits with one open and one covered with a translucent material.

According to an embodiment of the invention, a hyper-spectral camera 2 with a conventional slit 1 ((a) on FIG. 2) can be converted to an intrinsic hyper-spectral camera by increasing the opening of the field of view slit by a factor of two and providing a translucent material 1c over half of the increased opening to provide a slit arrangement having a focused portion 1a and a diffused portion 1b, as shown in (b) on FIG. 2. According to another embodiment of the invention, the slit arrangement may also have two individual equal sized slits separated by a distance z with one opened focused portion slit 1a and another diffused portion slit 1b provided with a translucent material 1c, as shown in (c) on FIG. 2.

These novel slit arrangements allow the camera to take an exposure of a focused and a diffuse field of view at the same time. When scanning a field of view of interest 20 with the hyper-spectral camera 2, the positions of the location of the two fields of view are staggered such that the diffused field of view exposure is exposing a different location than the focused field of view. To perform the intrinsic spectral processing, the focused and diffuse fields of view must be of the same location. This is accomplished by correlating the locations of the focused and diffuse spectra then processing the spectra according to the intrinsic methodology to generate the intrinsic hyper-spectral data cube. Briefly, according to the simple intrinsic methodology, subtracting the diffuse spectra from the focused spectra in each correlated field of view. The resulting intrinsic spectra are then substituted into the classic data cube to yield an intrinsic data cube. However, it is important to note that the further apart the focused and diffuse portions are on the slit arrangement, the greater the difference in data acquisition between the focused and diffuse data, which can introduce variations in the foreground environment.

Figure 3:
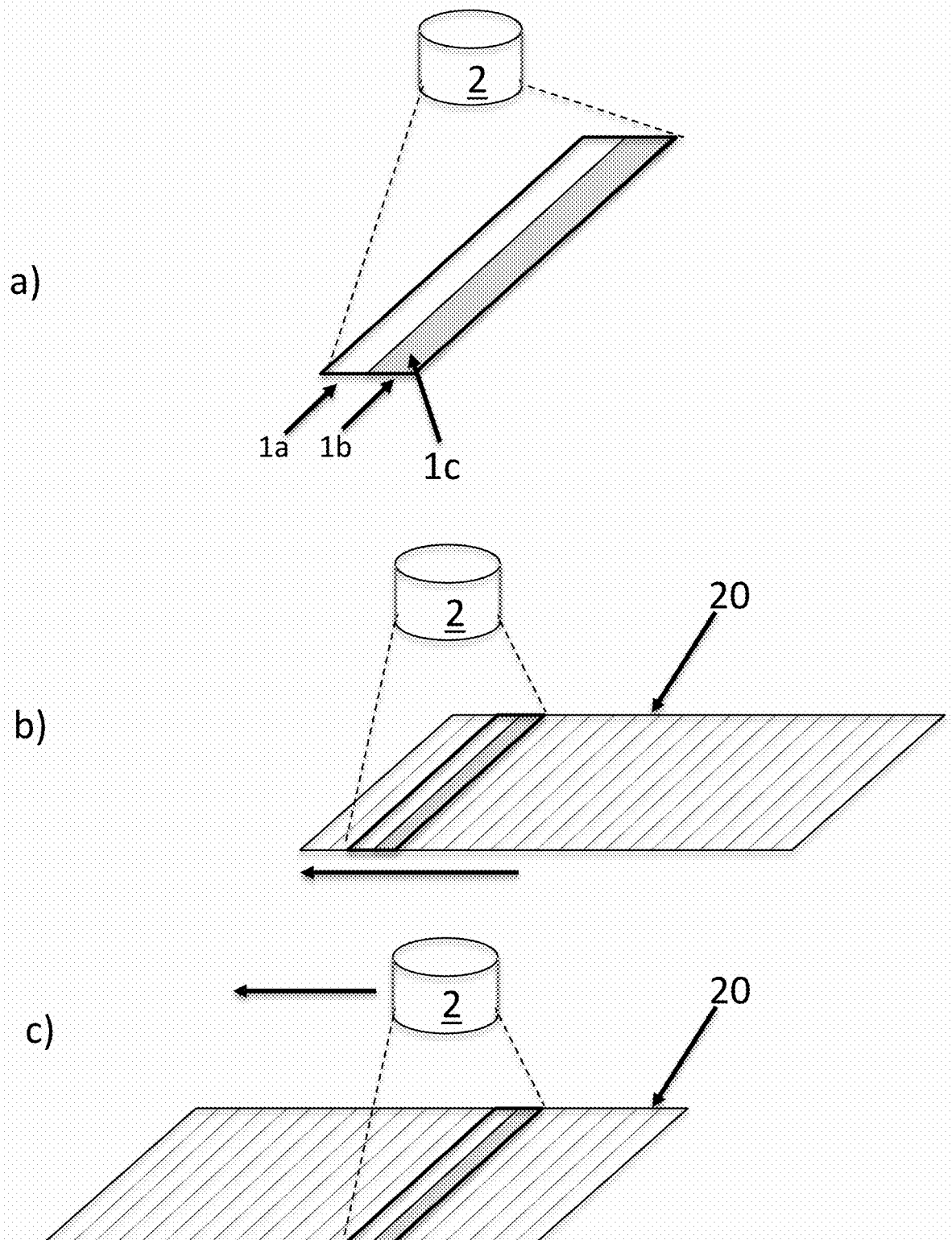
FIG. 3 illustrates in (a) a hyper-spectral camera and the field of view through a slit arrangement of the invention where images are obtained. The field of view is divided in half with the leading half open to obtain focused data and the trailing half covered with a translucent material to obtain the diffuse image of the illumination, in (b) and (c) the illustrations indicate the relationship between the field of view of a moving stage through the slit arrangement of the invention and the hyper-spectral camera.

A slit arrangement according to an embodiment of the invention is illustrated on FIG. 3, where a lens of an imaging device 2 is positioned with respect to the focused open slit portion 1a which is adjacent to diffused slit portion 1b having the translucent material 1c as shown in (a). The spectral data can be obtained in two ways: 1) the imaging device 2 remains static while the field of view 20 moves (as shown in (b)) or the imaging device 2 is moved while the field of field 20 remains static (as shown in (c)).

The intrinsic data cube significantly differs from the classic data cube in that it contains intrinsic spectral components that are consistent with respect to the environmental conditions. An intrinsic spectrum is defined as having only spectral components that are produced when a material absorbs electromagnetic energy. These intrinsic components include, but are not limited to, absorption, emission, transmission and partial-reflection. Any illumination energy that is not absorbed is considered irrelevant and removed from the intrinsic spectrum. Moreover, the atmospheric foreground contamination, i.e., air, water, aerosols, particulates, etc., at the time of exposure have been eliminated, as well as the irrelevant illumination components.

Once the raw data cube has been converted to an intrinsic data cube, a variety of novel display options are available. Rather than resorting to false color displays, the data can be displayed as the intrinsic colors of the materials in the field of view. This is possible even using a monochrome camera when substituting the intrinsic spectra for the spectral data in the classic data cube. It is also possible to create libraries of intrinsic spectra in the expected materials and combinations, thereof, in the fields of view so as to highlight their location in the field of view, as explained in co-pending U.S. patent application Ser. No. 17/067,952, incorporated herein by reference in its entirety.

EXAMPLES

Figure 4:
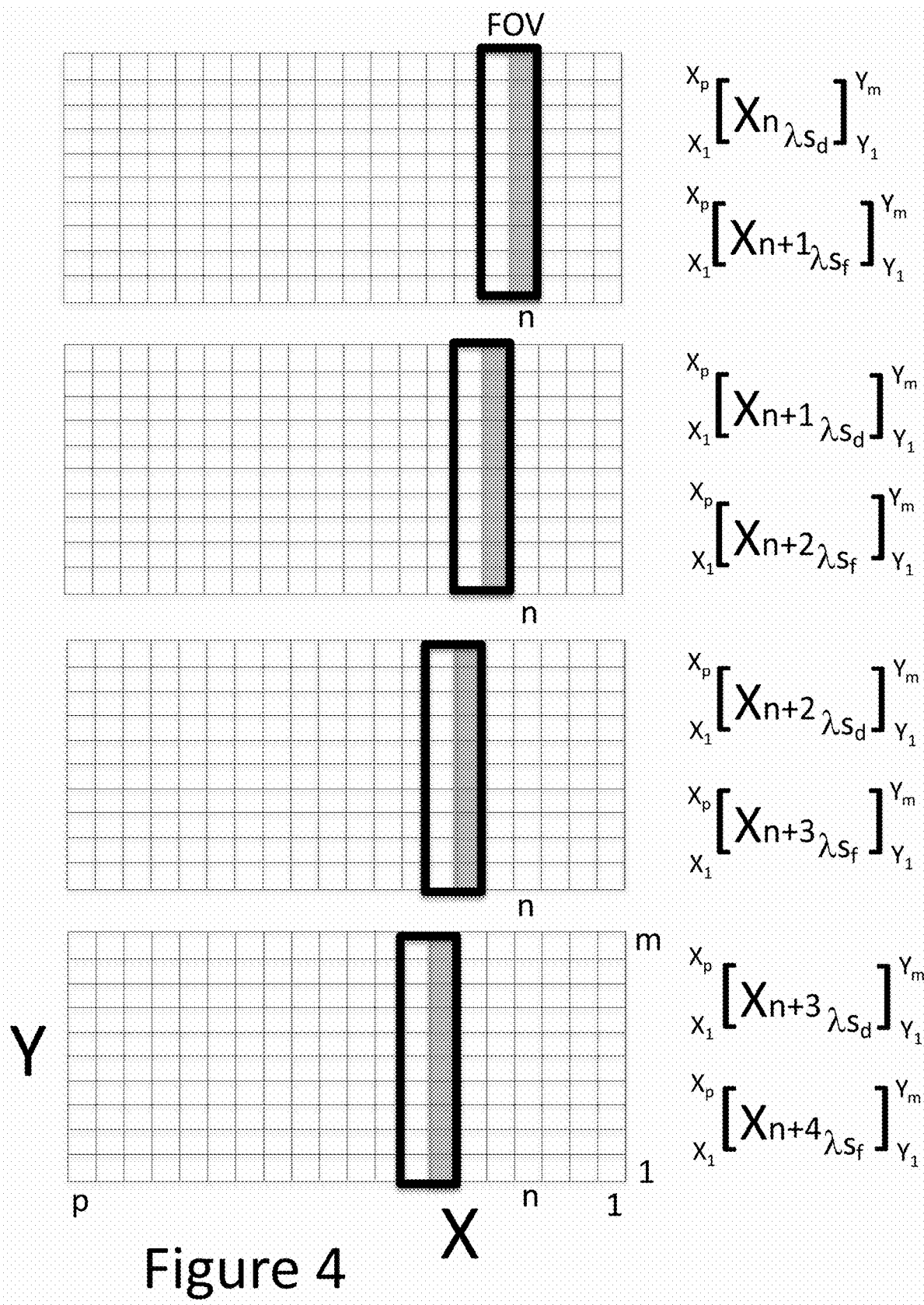
FIG. 4 illustrates the field of view through an embodiment of the slit arrangement of the invention as the hyper-spectral camera travels along the λ axis in an aerial example of data gathering and the respective mathematical expressions of the field of view for each half of the slit arrangement.
Figure 5:
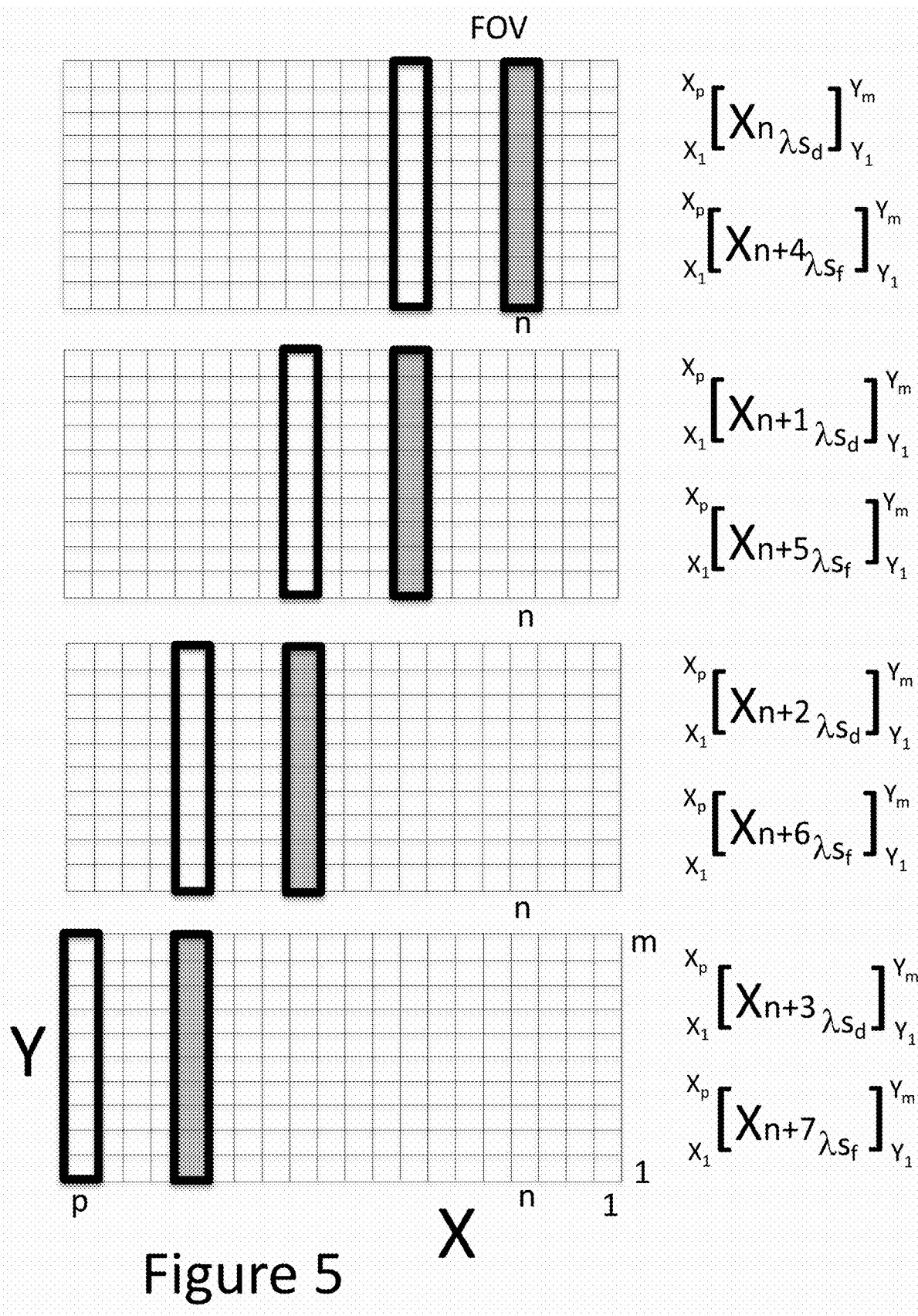
FIG. 5 illustrates the field of view through another embodiment of the slit arrangement of the invention as the hyper-spectral camera travels along the λ axis in an aerial example of data gathering and the respective mathematical expressions of the field of view for each half of the slit arrangement.

The following examples of the application of the novel slit arrangement are based on the illustrations in FIGS. 4-6. The field of view represented by an intrinsic hyper-spectral camera mounted on an airborne system that is scanning a field of view from a fixed altitude. According to one embodiment of the invention, the field of view exposed through the novel slit arrangement is indicated by a rectangle comprised of a focused (open/uncovered) portion and a diffused (translucent) portion as illustrated by (b) in FIG. 2 and FIG. 4. The field of view from the airborne system moves along the λ axis from right to left, exposing new locations. The following mathematical expressions represent the data obtained within the fields of view for the raw data cube using the slit arrangement (b) illustrated in FIG. 2.

$$\begin{smallmatrix}X_p\\X_1\end{smallmatrix}\left[X_{n+1\lambda S_f}\right]\begin{smallmatrix}Y_m\\Y_1\end{smallmatrix}\begin{smallmatrix}X_p\\X_1\end{smallmatrix}\left[X_{n\lambda S_d}\right]\begin{smallmatrix}Y_m\\Y_1\end{smallmatrix}\text{ Position }n$$

$$\begin{smallmatrix}X_p\\X_1\end{smallmatrix}\left[X_{n+2\lambda S_f}\right]\begin{smallmatrix}Y_m\\Y_1\end{smallmatrix}\begin{smallmatrix}X_p\\X_1\end{smallmatrix}\left[X_{n+1\lambda S_d}\right]\begin{smallmatrix}Y_m\\Y_1\end{smallmatrix}\text{ Position }n+1$$

where:

n is an initial position of scanning;

X is the horizontal direction of scanning between the limits of 1-p of the field of view;

Y is the vertical length of the field of view between the limits of 1-m;

$\lambda_{sd}$ is the diffuse spectra of the field of view across the limits 1-m of Y; and $\lambda_{sf}$ is the focused spectra of the field of view across the limits 1-m of Y.

According to another embodiment of the invention, the field of view exposed through the novel slit arrangement is indicated by one rectangle comprised of a focused (open/uncovered) portion and another individual rectangle comprised of a diffused (translucent) portion separated from the focused portion by a distance z as illustrated by (c) in FIG. 2 and FIG. 5. The following mathematical expressions represent the data obtained within the fields of view for the raw data cube using the slit arrangement (c) illustrated in FIG. 2.

$$\begin{smallmatrix}X_p\\X_1\end{smallmatrix}\left[X_{n+h\lambda S_f}\right]\begin{smallmatrix}Y_m\\Y_1\end{smallmatrix}\begin{smallmatrix}X_p\\X_1\end{smallmatrix}\left[X_{n\lambda S_d}\right]\begin{smallmatrix}Y_m\\Y_1\end{smallmatrix}\text{ Position }n$$

$$\begin{smallmatrix}X_p\\X_1\end{smallmatrix}\left[X_{n+h+1\lambda S_f}\right]\begin{smallmatrix}Y_m\\Y_1\end{smallmatrix}\begin{smallmatrix}X_p\\X_1\end{smallmatrix}\left[X_{n+1\lambda S_d}\right]\begin{smallmatrix}Y_m\\Y_1\end{smallmatrix}\text{ Position }n+1$$

where:

n is an initial position of scanning;

h is the number of column of pixels separating the generated pair of columns+1;

X is the horizontal direction of scanning between the limits of 1-p of the field of view;

Y is the vertical length of the field of view between the limits of 1-m;

$\lambda_{sd}$ is the diffuse spectra of the field of view across the limits 1-m of Y; and $\lambda_{sf}$ is the focused spectra of the field of view across the limits 1-m of Y.

According to the embodiments explained, scanning of the field of view is carried out in the X direction from right to left and the diffuse portion is shown on the right-side portion and the focused portion is shown on the left side portion of the slit arrangement. These parameters are selected from a practical standpoint, since as part of the calibration process of the hyper-spectral camera, a focusing step is needed prior to begin the scanning procedure. Moreover, the intrinsic processing methodology is implemented to remove any irrelevant spectral components from the focused spectral images. Accordingly, since the scanning is done from right to left, the slit arrangement (with the diffuse portion provided on the right portion) will allow the hyper-spectral camera to obtain the diffuse spectra of the last desired position (e.g., n+5) on the field of view of interest. Since the focused portion is positioned on the left side of the slit arrangement, the focused spectra of the last desired position (e.g., n+5) has already been obtained in the scan and, as such the diffused spectra can easily be subtracted from the focused spectra according to the intrinsic processing methodology of the invention. However, scanning can also be carried out from left to right and/or the diffuse portion can be provided on the left-side portion and the focused portion is shown on the right-side portion of the slit arrangement as long as the hyper-spectral camera system and/or associated software is able to accurately determine and correlate each scanning step of the field of view of interest with the corresponding focused and diffused spectra along with their respective positions (i.e., $$X_{n+2\lambda S_f}$$

and $$X_{n\lambda S_d})$$

obtained using the specific split arrangement selected.

According to the invention, a field of view is represented by a pixel matrix array (p,m) as generated by a hyper-spectral digital camera, where the X direction limits are established from a position n=1 to a position n=p and the width Y of the field of view is represented by the limits from a pixel 1 to a pixel m (see FIGS. 4-5). It is important to understand that according to the present invention, a field of view of interest is considered to be any portion of the viewable field of view. In this regard, it is possible that a user is interested in obtaining a hyper-spectral data cube of the entire field of view in which case the X and Y limits of the field of view of interest will coincide with the X and Y limits of the entire field of view achievable by the hyper-spectral camera. Alternatively, a user might be interested in obtaining hyper-spectral data cube of only a portion of the entire field of view in which case the X and/or Y limits of the field of view of interest will not necessarily coincide with the X and/or Y limits of the entire field of view achievable by the hyper-spectral camera. For example, as illustrated in FIG. 4, a user can only obtain focused and diffused spectral images from an initial position where the n=4 and a final position where n=7 by using a slit arrangement of the present invention where the scanning process will stop when the slit arrangement reaches the position where n=7. According to this example, a hyper-spectral intrinsic data cube can be generated from a portion of the field of view between n=1 and n=3 since focused and diffused spectral images for only these positions will be obtained during the scanning process. It should be evident that when a hyper-spectral intrinsic data cube is desired between an initial and a final position of the field of view, the scanning process must be carried out so that focused and diffused spectral images for both the initial and the final positions are obtained so that the intrinsic processing methodology can be applied to generate a hyper-spectral intrinsic data cube between the desired limits. Accordingly, it is envisioned that a field of view of interest can be: 1) the entire field of view achievable by the hyperspectral camera (i.e., X-Y limits), 2) a field of view including the entire Y direction limits but including only a portion of the X direction limits, 3) a field of view including the entire X direction limits and a portion of the Y direction limits or, 4) a field of view including a portion of the Y direction limits and a portion of the X direction limits. For the purpose of this specification and the invention, the phrase "a field of view of interest" means and includes any of the four possible field of view of interest explained above.

Therefore, considering that to perform the intrinsic spectral processing, the focused and diffuse fields of view must be of the same location, the following equation represents the step to determine the intrinsic spectra for every position of the field of view in order to convert the raw intrinsic data cube into the processed intrinsic data cube:

$$\frac{X_p}{X_1}\left[X_{n+1_{\lambda_{SI}}}\right]\frac{Y_m}{Y_1} = \frac{X_p}{X_1}\left[X_{n+1_{\lambda S_f}}\right]\frac{Y_m}{Y_1} - \frac{X_p}{X_1}\left[X_{n+1_{\lambda S_d}}\right]\frac{Y_m}{Y_1}$$

where: $\lambda_{SI}$ is the spectra representing the processed intrinsic spectra.

After the field of view exposures are obtained through the novel slit arrangement, all the focused spectral data columns are sequentially combined (i.e., n, n+1, n+2 ... , p) to form a pixel matrix array of the focused field of view and all the diffused spectral data columns are sequentially combined to form a pixel matrix array of the diffused field of view. This is performed by software running in a computer or a processing unit external and/or integrated into the imaging device that processes the focused and diffused spectral data obtained and spatially correlates each pixel of the column generated with a corresponding spatial position in the analog field of view of interest. In the case of the slit arrangement having the focused and the diffused slits separated by a distance z, the software uses the distance z to determine the separation of columns of pixels between the generated pair of columns. In both cases, the exact spatial correlation between the generated pair of columns of pixels and their associated position on the analog field of view is determined in order to ensure that the focused and diffused spectral data columns are sequentially combined $$\left(\text{e.g., } X_{n_{\lambda S_f}}, X_{n+1_{\lambda S_f}}, X_{n+2_{\lambda S_f}} \ldots \text{ and } X_{n_{\lambda S_d}}, X_{n+1_{\lambda S_d}}, X_{n+2_{\lambda S_d}} \ldots\right)$$

to form respective focused and diffused pixel matrix arrays

Once the pixel matrix arrays have been established, the intrinsic processing, both simple and advanced can be carried out on the raw intrinsic data cube as described in U.S. Pat. Nos. 10,337,916B1 US and 10,652,484B1, incorporated herein by reference in their entirety. The simple method consists of direct pixel-by-pixel subtraction of the diffuse illumination spectra matrix from the focused spectra matrix yielding a processed data cube. The advanced method of data cube processing requires the use of the white balance standard typically used to calibrate the reflectance as a function of the radiance. The advanced processing first requires obtaining an unprocessed intrinsic data cube of the white balanced standard to serve as the field of view without any spatial detail. After correlating the fields of view through the slit, the diffuse spectra are subtracted from the focused spectra yielding a set of residual spectra that are then added into diffuse spectra and that combination is further subtracted from the focused spectra resulting in a Zero Order data cube where all spectral values are zero. In subsequent data cube acquisition, the residual spectra are added to the new diffuse spectra, respectively, and the combinations subtracted from the focused spectra of the new data cube, respectively, yielding a processed intrinsic data cube.

Figure 1:
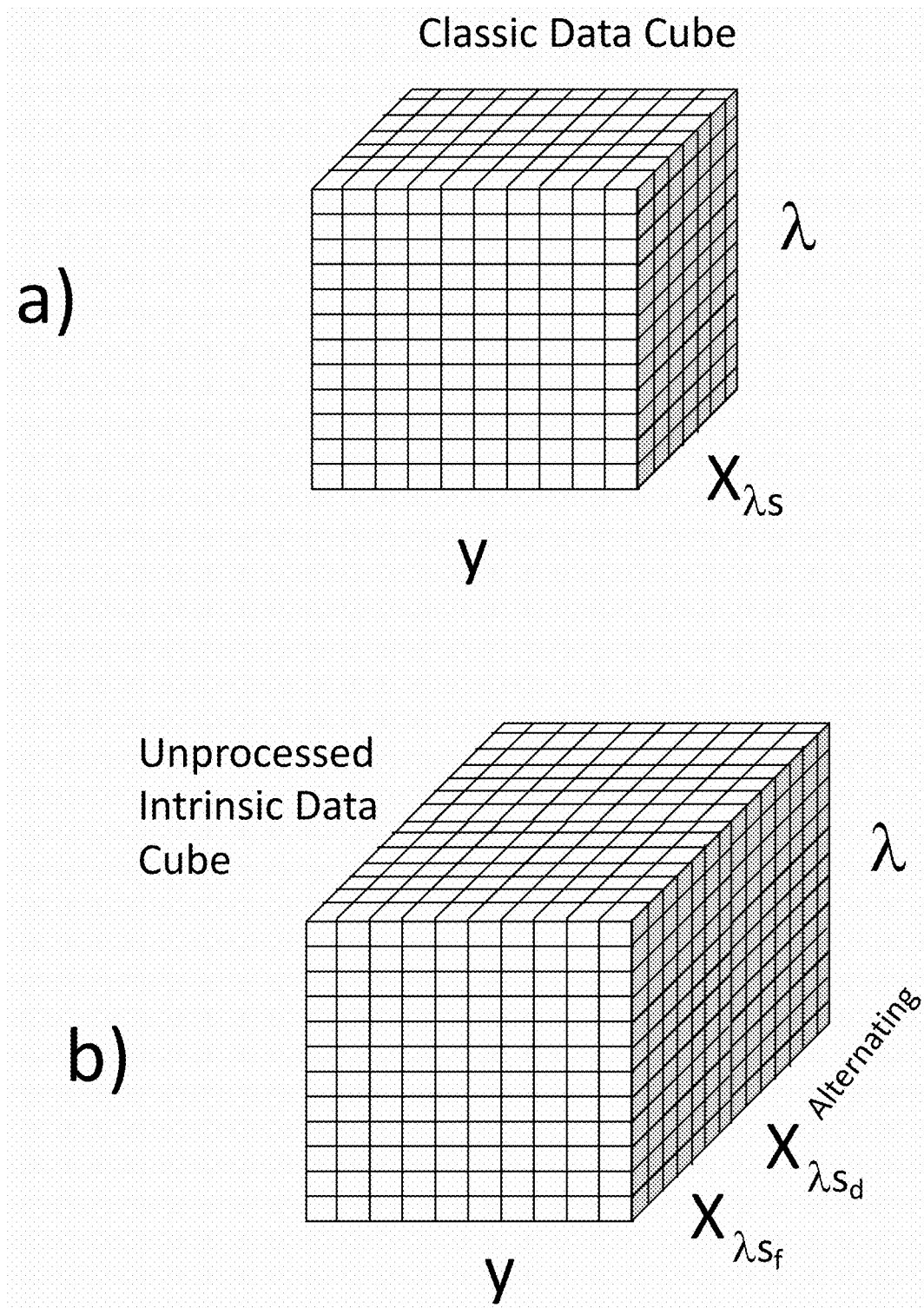
FIG. 1 illustrates in (a) a n unprocessed classic data cube obtained from a hyper-spectral camera. The X and Y axes represent the spatial data of the field of view and the $\lambda$ axis represents the spectral data associated with each pixel in the data cube and in (b) illustrates an unprocessed intrinsic data cube where the $\lambda$ axis is twice the length spectral data. This X-axis contains spectral focused and diffuse data associated with each pixel, respectively. The planes of focused and diffuse data presented by the X and $\lambda$ axes alternate within the data cube.

It is important to understand, that unprocessed intrinsic data cubes consist of three forms of data: 1) spatial data, 2) focused spectral data and 3) diffuse spectral data. According to the invention, the first two forms of data are obtained through the open slit 1a and are further separated optically where the spatial data is optically directed to an imaging camera focal plane of a sensor array and the focused spectral data obtained through the focused slit 1a is directed onto a diffraction grating and then reflected to a different camera focal plane sensor array. The diffuse spectral data is obtained through the slit 1b covered with a translucent material 1c such that no spatial detail is present in the data passing through the translucent covered slit. This diffuse data is directed to a diffraction grating and then reflected to a camera focal plane sensor array. These three data forms are then combined and arranged into an unprocessed Intrinsic data cube, as shown in b) on FIG. 1.

Figure 7A:
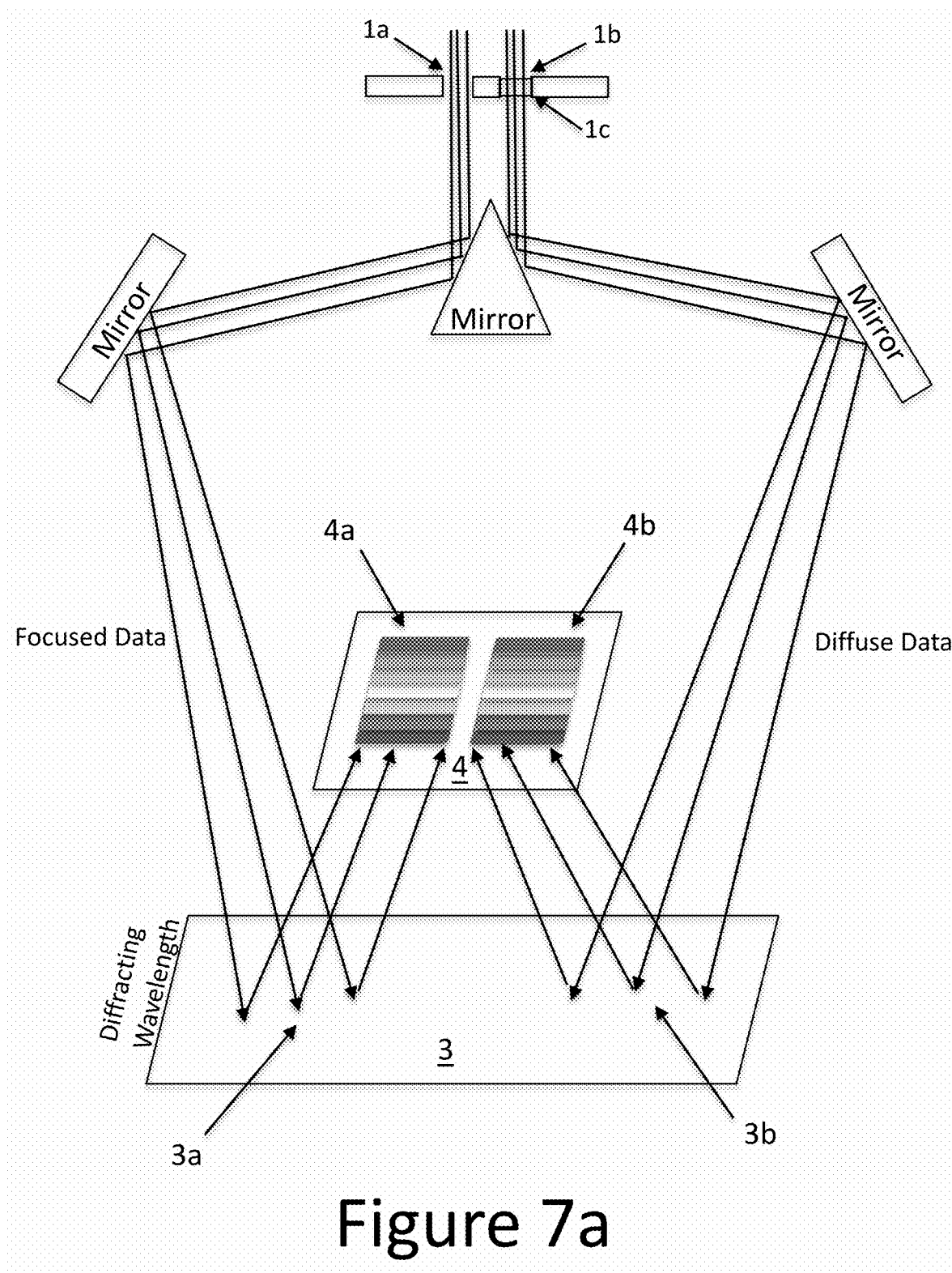
FIG. 7a illustrates an optical configuration of the two-slit arrangement where the focused and diffuse illumination data is directed to different areas of a single diffraction grating and the dispersed illuminations are directed to a single sensor array.
Figure 7B:
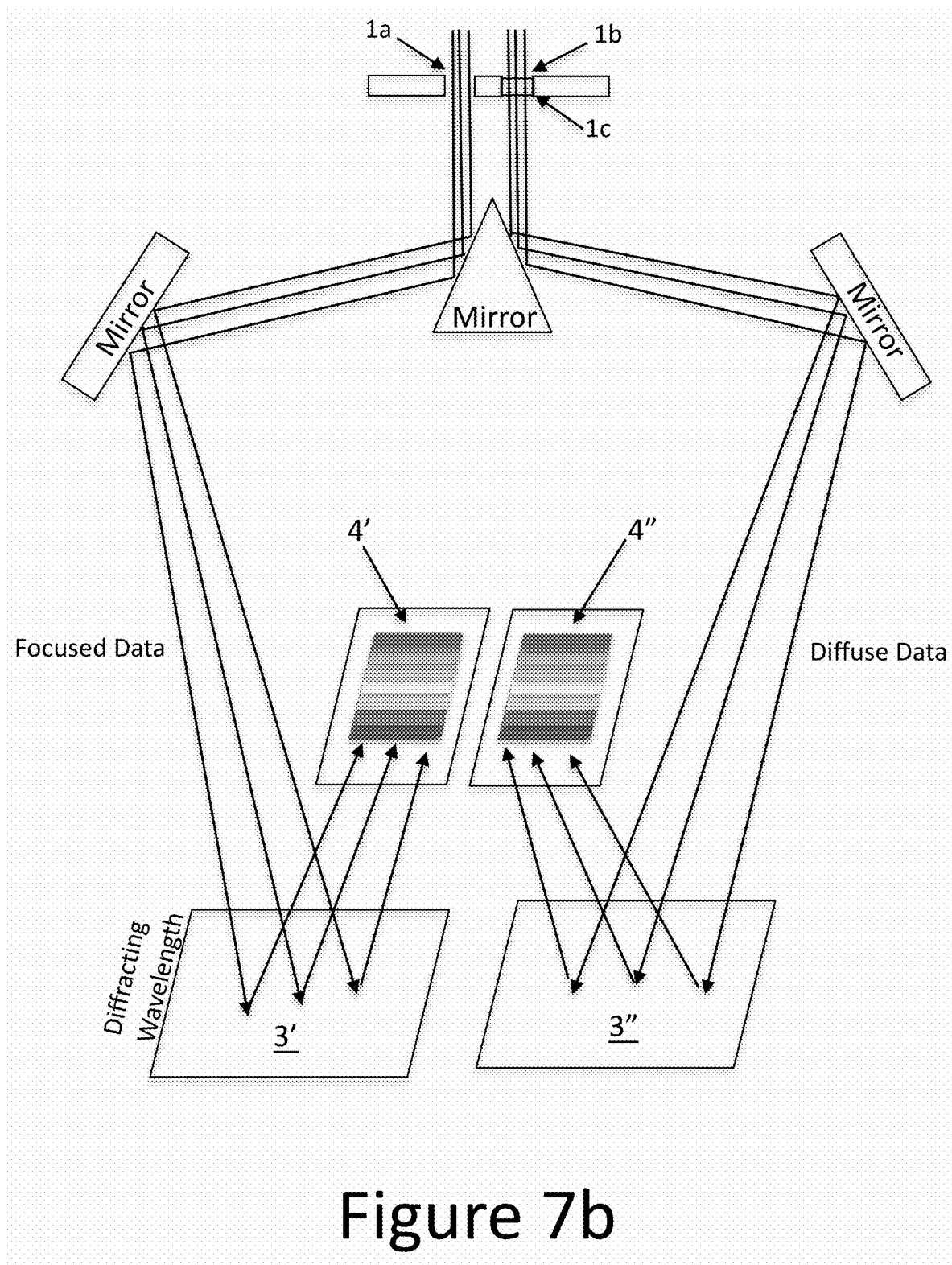
FIG. 7b illustrates another optical configuration of the two-slit arrangement where the focused and diffuse illumination data is directed to two different diffraction gratings and the dispersed illuminations are directed to a two different sensor arrays.

According to a preferred embodiment of the invention, the optimum optical configuration of data collection is where the focused spectral data obtain through the open slit 1a is directed to one area 3a of a diffraction grating 3 and then onto one area 4a of the spectral focal plane sensor array 4 and the diffuse spectral data obtain through the diffuse slit 1b is directed to a different area 3b of the same diffraction grating 3 then reflected onto a different area 4b of the same spectral focal plane sensor array 4, as shown in FIG. 7a. Alternatively, two separate diffraction gratings (3', 3") and two separate spectral focal plane sensor arrays (4', 4") can be used, as shown in FIG. 7b. Specifically, the focused spectral data obtain through the open slit 1a is directed to the diffraction grating 3' and then onto the spectral focal plane sensor array 4' and the diffuse spectral data through the diffuse slit 1b is directed to the diffraction grating 3" then reflected onto the spectral focal plane sensor array 4".

Figure 8:
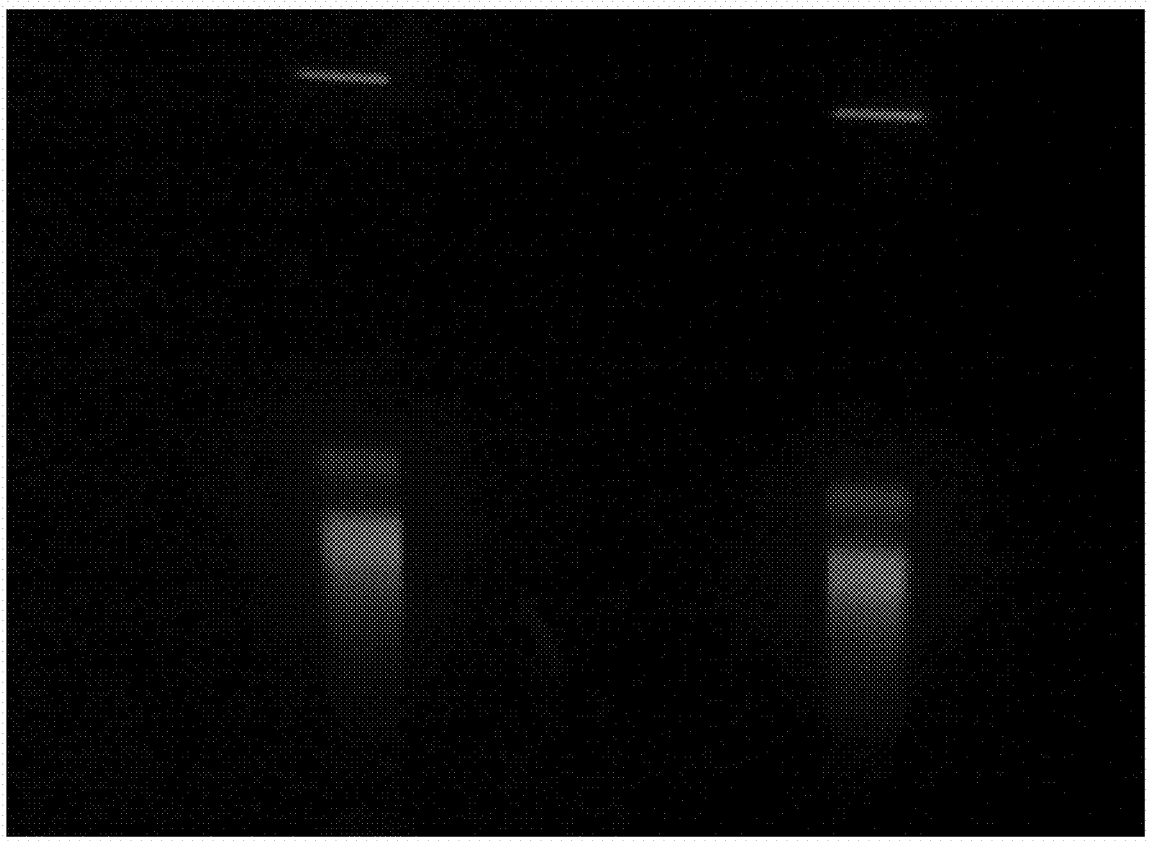
FIG. 8 shows a color photo of detracted illumination from two different slits from the same diffraction grating on the same sensor array.

As can be appreciated from the spectral image in FIG. 8, the slit arrangement of the present invention allows to simultaneously obtain focused and diffused spectral data of a field of view.

Figure 9A:
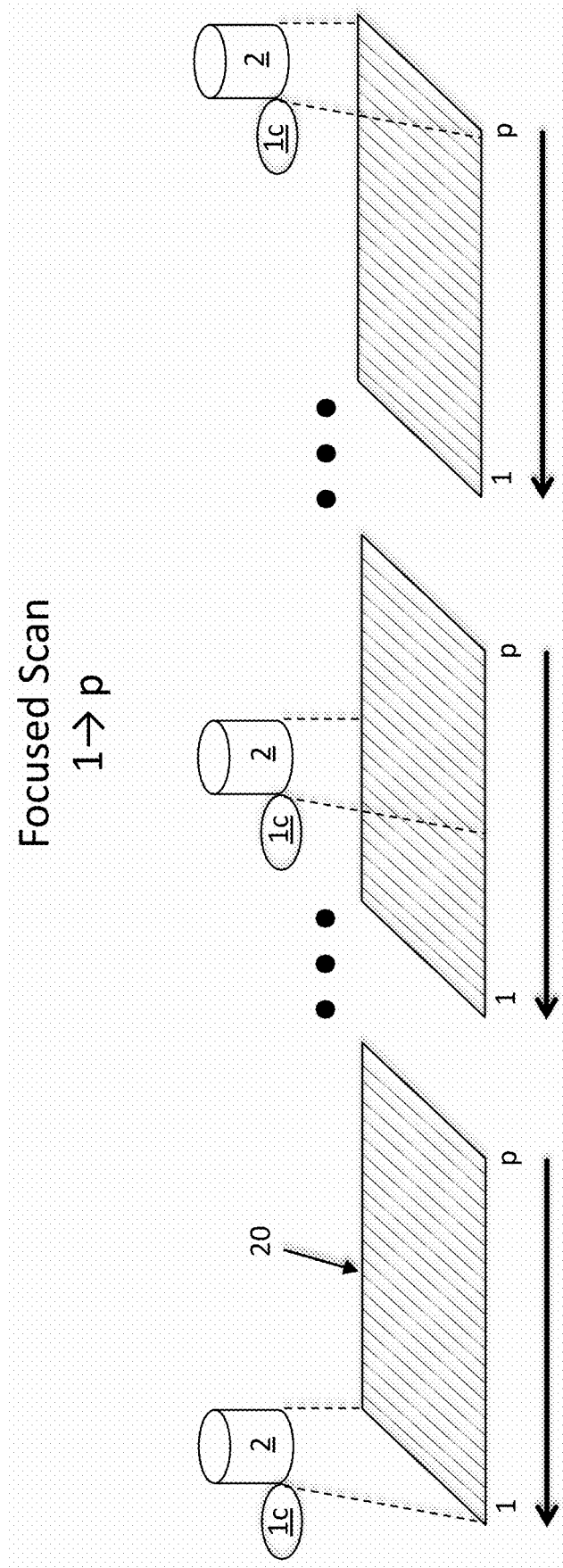
FIG. 9a illustrates a configuration of an imaging device in a fixed position while a focused scan of the field of view is carried out via a precision movable stage or conveyor belt, according to an embodiment of the invention.

According to another embodiment of the invention, the present method is implemented through a configuration where a hyperspectral camera 2 is in a fixed position and the field of view 20 is scanned via a precision movable stage or conveyor belt with the capacity to conduct a second scan covering the exact same field of view as the first scan. The first scan is conducted from points 1-p with the spatial field of view in camera focus, as shown in FIG. 9a, wherein the precision movable stage or conveyor belt is moved back to its original position once the scan is performed and the second scan is conducted again from points 1-p with a diffuse material 1c covering the objective camera lens, as shown in FIG. 9b, such that no spatial detail is present in the second scan, thus containing only illumination data.

The generated focused and diffuse data cubes are then processed by the intrinsic methodology where the diffuse spectra of each sensory pixel is subtracted from the corresponding focused pixel resulting in a data cube containing intrinsic spectra associated to each respective sensor pixel. Alternatively, the advanced methodology can be used which includes scanning a blank white reference field of view by the focused camera and then with the camera having a diffuse material covering the camera lens. The resulting diffuse spectra is subtracted wavelength by wavelength from the focused spectra to generate a Residual spectrum that is added back to the diffuse spectrum. A Zero Order Spectrum is generated when the combined diffuse and Residual spectrum are subtracted from the focused spectrum. This process eliminates all spectral components arising from the instrument and diffuse material.

Although the present invention has been described herein with reference to the foregoing exemplary embodiment, this embodiment does not serve to limit the scope of the present invention. Accordingly, those skilled in the art to which the present invention pertains will appreciate that various modifications are possible, without departing from the technical spirit of the present invention.

The invention claimed is:

1. A slit arrangement for a hyperspectral camera comprising:
   a focused portion having a passthrough opening configured to obtain focused spectral data;
   a diffused portion having a translucent material configured to obtain diffused spectral data and being positioned adjacent to said focused portion, wherein the slit arrangement is part of the hyperspectral camera comprising a diffraction grating configured to receive and diffract said focused spectral data from said focused portion and said diffused spectral data from said diffused portion; and a spectral focal plane sensor array configured to receive said diffracted focused spectral data and said diffracted diffused spectral data.

2. The slit arrangement according to claim 1, wherein said focused portion and said diffused portion are provided on a single slit.

3. The slit arrangement according to claim 1, wherein said focused portion and said diffused portion are provided on individual separate slits.

4. The slit arrangement according to claim 1, wherein said diffraction grating comprises a single diffraction grating having a focused portion configured to receive said focused spectral data and a diffused portion configured to receive said diffused spectral data.

5. The slit arrangement according to claim 1, wherein said diffraction grating comprises a first grating configured to receive said focused spectral data and a second grating separate from said first grating configured to receive said diffused spectral data.

6. The slit arrangement according to claim 1, wherein said spectral focal plane sensor array comprises a single sensor array having a focused portion configured to receive said diffracted focused spectral data and a diffused portion configured to receive said diffracted diffused spectral data.

7. The slit arrangement according to claim 1, wherein said spectral focal plane sensor array comprises a first spectral focal plane sensor configured to receive said diffracted focused spectral data and a second spectral focal plane sensor separate from said first spectral focal plane sensor configured to receive said diffracted diffused spectral data.

8. A method of generating an unprocessed data cube including spatial data, focused spectral data and diffuse spectral data of a field of view of interest, said method comprising:
   scanning said field of view of interest with an imaging device to obtain focused spectral data of said field of view of interest through an unobstructed portion of a slit arrangement of said imaging device and obtaining diffused spectral data of the same field of view of interest through a diffused portion of said slit arrangement having a diffused material; and
   generating the unprocessed data cube of said field of view of interest including the obtained focused spectral data of said field of view of interest, the obtained diffused spectral data of said field of view of interest and obtained spatial data of said field of view of interest.

9. The method according to claim 8, wherein said unobstructed portion and said diffused portion are provided on a single slit of said slit arrangement.

10. The method according to claim 8, wherein said unobstructed portion and said diffused portion are provided on individual separate slits of said slit arrangement.

11. The method according to claim 8, further comprising representing said field of view of interest by a pixel matrix array of spectral data having row direction limits established from a pixel position 1 to a pixel position p and column direction limits established from a pixel position 1 to a pixel position m, wherein the step of scanning the field of view of interest comprises simultaneously generating a pair of columns comprising a column of pixels of focused spectral data via said unobstructed portion and a column of pixels of diffused spectral data via said diffused portion, said scanning is repeated for each column of said field of view of interest.

12. The method according to claim 11, wherein said pair of generated columns are adjacent to each other as defined by:

$$\begin{matrix} X_p \\ X_1 \end{matrix} \left[ X_{n+1\lambda S_f} \right] \begin{matrix} Y_m \\ Y_1 \end{matrix} \begin{matrix} X_p \\ X_1 \end{matrix} \left[ X_{n\lambda S_d} \right] \begin{matrix} Y_m \\ Y_1 \end{matrix} \text{Position } n$$

$$\begin{matrix} X_p \\ X_1 \end{matrix} \left[ X_{n+2\lambda S_f} \right] \begin{matrix} Y_m \\ Y_1 \end{matrix} \begin{matrix} X_p \\ X_1 \end{matrix} \left[ X_{n+1\lambda S_d} \right] \begin{matrix} Y_m \\ Y_1 \end{matrix} \text{Position } n+1$$

where:
n is an initial position of scanning;
X is the horizontal direction of scanning between the limits of 1-p of the field of view;
Y is the vertical length of the field of view between the limits of 1-m;
$\lambda_{sd}$ is the diffuse spectra of the field of view across the limits 1-m of Y; and
$\lambda_{sf}$ is the focused spectra of the field of view across the limits 1-m of Y.

13. The method according to claim 11, wherein said pair of generated columns are separated by at least one column of pixels as defined by:

$$\begin{matrix} X_p \\ X_1 \end{matrix} \left[ X_{n+h\lambda S_f} \right] \begin{matrix} Y_m \\ Y_1 \end{matrix} \begin{matrix} X_p \\ X_1 \end{matrix} \left[ X_{n\lambda S_d} \right] \begin{matrix} Y_m \\ Y_1 \end{matrix} \text{Position } n$$

$$\begin{matrix} X_p \\ X_1 \end{matrix} \left[ X_{n+h+1\lambda S_f} \right] \begin{matrix} Y_m \\ Y_1 \end{matrix} \begin{matrix} X_p \\ X_1 \end{matrix} \left[ X_{n+1\lambda S_d} \right] \begin{matrix} Y_m \\ Y_1 \end{matrix} \text{Position } n+1$$

where:
n is an initial position of scanning;
h is number of column of pixels separating the generated pair of columns+1;
X is the horizontal direction of scanning between the limits of 1-p of the field of view;
Y is the vertical length of the field of view between the limits of 1-m;
$\lambda_{sd}$ is the diffuse spectra of the field of view across the limits 1-m of Y; and
$\lambda_{sf}$ is the focused spectra of the field of view across the limits 1-m of Y.

14. The method according to claim 11, wherein the focused spectral data of said field of view of interest is generated by sequentially combining all the columns of pixels of focused spectral data generated and the diffused spectral data of said field of view of interest is generated by sequentially combining all the columns of pixels of diffused spectral data generated.

15. The method according to claim 8, wherein scanning the field of view of interest is carried out by either moving the imaging device while the field of view of interest remains static or maintaining the imaging device static while the field of view of interest is moving.

16. A method for generating an unprocessed data cube including spatial data, focused spectral data and diffuse spectral data of a field of view of interest, said method comprising:

performing a first scanning of said field of view of interest with an imaging device in a static position while said field of view of interest is moved in order to obtain focused spectral data of said field of view of interest;

performing a second scanning of the field of view of interest with said imaging device in the static position and having a diffuse material covering a lens of said imaging device while said field of view of interest is moved in order to obtain diffused spectral data of the same field of view of interest; and generating the unprocessed data cube of said field of view of interest including the obtained focused spectral data of said field of view of interest, the obtained diffused spectral data of said field of view of interest and obtained spatial data of said field of view of interest.

17. The method according to claim 16, wherein said diffuse material is either incorporated with said imaging device at manufacture or provided as a removable element.

18. The method according to claim 16, wherein said diffuse material is moved to cover said lens either manually or automatically.

\* \* \* \* \*